Patented Oct. 24, 1944

2,360,828

UNITED STATES PATENT OFFICE 2,360,828

COATING COMPOSITIONS

William L. Craig, Westport, Conn., assignor to R. T. Vanderbilt Company, Inc., New York, N. Y., a corporation of New York No Drawing. Application May 28, 1942,
Serial No. 444,840

4 Claims. (Cl. 106—157)

This invention relates to coating compositions and more particularly it relates to coating compositions adapted for the coating of fibrous sheet material such as paper. The invention provides a new process for preparing such coating compositions. In one aspect the invention is an improvement upon that described in my application filed December 11, 1941, Serial No. 422,522.

The usual type of coating composition used for the coating of fibrous sheet material such as paper consists essentially of a mineral or pigment such as clay, titanium dioxide, calcium carbonate, barium sulfate, calcium sulfate, etc., plus a prepared adhesive such as casein or starch. The finished composition may also contain such materials as defoaming agents, leveling agents, etc., and, if it is to be used to impart color to the fibrous sheet material, may also include dyes or color pigments. In the usual preparation of such compositions it has been the practice to disperse the mineral or pigment in water by mechanical agitation and then mix the resulting composition with an adhesive which is prepared separately.

Thus if casein is used as the adhesive, it is first mixed with water and then an alkaline material such as soda ash, borax, trisodium phosphate, caustic soda or ammonia, and the resulting composition is then heated to dissolve the casein. If a treated starch such as chlorinated gum is to be used as the adhesive, the starch is dispersed in water and heated to put the starch into colloidal solution. An untreated starch such as raw corn starch, tapioca starch or potato starch may be prepared by admixing the starch with water and then heating the mixture in the presence of an amylolytic enzyme to convert the starch into a mixture of the desired viscosity.

In the usual preparation of coating compositions, the aqueous mineral or pigment suspensions are mixed with separately prepared adhesive compositions of the type indicated above.

In accordance with the process of this invention a coating composition is prepared by forming an aqueous suspension of a mineral or pigment, incorporating a raw starch in the suspension and then subjecting the resulting mixture to the action of an amylolytic enzyme. Several important advantages are secured by proceeding in this manner. However, such enzymes are with advantage supplied on a protein carrier and with the enzyme in this form the results are not uniform unless special precautions are taken. I have discovered that this variable is the consequence of a varying protein absorptive capacity specific to different individual minerals and pigments. That is, the specific absorptive capacity of a particular mineral or pigment may vary from nothing up to a maximum within my experience of something less than 1% by weight on the mineral or pigment. To the extent that the mineral or pigment absorbs the protein carrying the enzyme, the enzyme is rendered inactive with respect to the starch, and since the absorption varies, the results vary. Applying this discovery, in accordance with my present invention, I supply the enzyme on a protein carrier and I satisfy the specific protein absorptive capacity of the mineral or pigment by the addition of a sufficient proportion of protein to the suspension before incorporating the enzyme.

The enzyme used in effecting the conversion of the starch is advantageously a liquefying enzyme as distinguished from a saccharifying enzyme, particularly a liquefying enzyme produced by bacterial fermentation, having a high alpha amylase content and substantially free from beta amylase, insensitive to temperatures up to about 180° F. and active in alkaline media. The enzyme should have a liquefon (analytical edition, Journal of Industrial and Engineering Chemistry, volume 7, pages 143–6, May 15, 1935) content of about 500–1200 per gram.

In preparing the coating compositions in accordance with my invention, the desired proportion of mineral or pigment is thoroughly dispersed in water, about 1% by weight on the pigment or somewhat less of protein is then dispersed in this suspension and, the starch having been incorporated in the mixture either before or after the addition of the protein, the pH of the mixture is adjusted to approximate neutrality, advantageously within a pH range of from about 6.5 to about 7.5, by the addition of a small amount of either an alkaline material such as borax or an acid material such as alum. A suitable amount of a liquefying enzyme on a protein carrier is added after the addition of the protein to the suspension of mineral or pigment. The mixture including the enzyme is heated until the enzyme converts the starch and reduces the viscosity of the mixture to a point such that it is suitable for application to paper or other fibrous sheet materials by the usual coating methods.

For example, a coating composition is prepared from the following materials in the proportions indicated:

| | Parts |
|---|---|
| Water | 204 |
| Tetrasodium pyrophosphate | 0.1 |
| Coating clay | 100 |
| Casein | 1.0 |
| Pearl cornstarch (raw or untreated) | 25.0 |
| Liquefying enzyme on protein carrier | 0.5 |

The tetrasodium pyrophosphate, used as an agent for dispersing the clay, is dissolved in the water. The dry clay is then added to the water and dispersed by mechanical agitation. The casein is then added to the clay suspension and thoroughly dispersed by continued mechanical agitation. The dry starch and the enzyme on a protein carrier are then added to the mixture and dispersed therein. The pH of the mixture is adjusted to about 7.0 by the addition of about 0.25 part of borax. The mixture, adjusted to approximate neutrality, is then heated in a steam jacketed kettle to about 170° F., held at that temperature for about 15 minutes, then heated to about 200° F., held at that temperature for about 10 minutes and then cooled to room temperature. The coating composition prepared in this manner is adapted for application to paper by brush coating. More viscous compositions are appropriate for application to paper by machine coating.

Instead of cornstarch other starches such as for example tapioca or potato starch may be used in accordance with my invention. Alpha protein, soy bean protein and similar products may be used in place of the casein specifically mentioned in the foregoing example. Similarly, the minerals or pigments with which the starch is admixed prior to its conversion may include the usual types of minerals or pigments employed in the coating of paper or other fibrous sheet materials.

The protein required to satisfy the specific protein absorptive capacity of the particular mineral or pigment can be supplied by using an excess of the enzyme and its associated protein carrier, but this is uneconomical and further fails to eliminate variability. The preliminary satisfaction of this specific protein absorptive capacity, prior to incorporation of the enzyme, by the addition of a small proportion of protein, a proportion I have never found to exceed 1%, not only eliminates waste of the enzyme but also, since any excess protein does no harm, eliminates the variability without requiring specific control. By adding between about 0.5% and 1% of protein regardless of the particular mineral or pigment used, time and materials are saved and uniform results are secured.

Paper coated with compositions prepared in accordance with my invention has important advantages over paper treated with the usual type of coating compositions. The new coating compositions have superior binding strength, that is adherence to the paper, and produce a higher finish or gloss and a smoother surface on the paper. It also seems that improved dispersions of the mineral or pigment in the coating composition are secured in the practice of my invention. Coated paper having improved opacity may also be produced with the compositions of my invention.

I claim:

1. The method of preparing coating compositions which comprises forming an aqueous suspension of a material from the group consisting of minerals and pigments, adding thereto a proportion of protein sufficient to satisfy the specific protein absorptive capacity of the mineral or pigment, incorporating a raw starch therein and subjecting the resulting mixture to the action of an amylolytic enzyme on a protein carrier added subsequent to the addition of protein first mentioned.

2. The method of preparing coating compositions which comprises forming an aqueous suspension of a material from the group consisting of minerals and pigments, adding thereto a proportion of protein sufficient to satisfy the specific protein absorptive capacity of the mineral or pigment, incorporating a raw starch therein and subjecting the resulting mixture to the action of a starch-liquefying enzyme on a protein carrier added subsequent to the addition of protein first mentioned.

3. The method of preparing coating compositions which comprises forming an aqueous suspension of a material from the group consisting of minerals and pigments, adding thereto a proportion of protein sufficient to satisfy the specific protein absorptive capacity of the mineral or pigment, subsequently incorporating a raw starch and a starch-liquefying enzyme on a protein carrier therein, adjusting the pH of the mixture to between about 6.5 and 7.5 and then heating the resulting mixture to aid the enzyme in liquefying the starch.

4. A method of preparing coating compositions which comprises forming an aqueous suspension of a material from the group consisting of minerals and pigments, adding protein thereto in an amount approximating 1% by weight on the mineral or pigment, incorporating a raw starch therein and subjecting the resulting mixture to the action of a starch-liquefying enzyme on a protein carrier added subsequent to the addition of protein first mentioned.

WILLIAM LUTTON CRAIG.